United States Patent
Yang et al.

(10) Patent No.: US 7,760,478 B2
(45) Date of Patent: Jul. 20, 2010

(54) CONTROL CIRCUIT WITH SHORT-CIRCUIT PROTECTION FOR CURRENT SENSE TERMINAL OF POWER CONVERTERS

(75) Inventors: Ta-Yung Yang, Milpitas, CA (US); Wei-Hsuan Huang, Taoyuan (TW); Rui-Hong Lu, Shueishang Township, Chiayi County (TW)

(73) Assignee: System General Corp., Taipei (TW)

( * ) Notice: Subject to any disclaimer, the term of this patent is extended or adjusted under 35 U.S.C. 154(b) by 795 days.

(21) Appl. No.: 11/687,056

(22) Filed: Mar. 16, 2007

(65) Prior Publication Data

US 2008/0232018 A1    Sep. 25, 2008

(51) Int. Cl.
 *H02H 7/00* (2006.01)
(52) U.S. Cl. .................................................. 361/93.1
(58) Field of Classification Search ................. 361/93.1
 See application file for complete search history.

(56) References Cited

U.S. PATENT DOCUMENTS 7,061,225 B2 * 6/2006 Yang et al. ............... 324/103 P
7,116,565 B1 * 10/2006 Yang ............................ 363/24
7,313,004 B1 * 12/2007 Yang et al. ................ 363/21.02
7,486,493 B2 * 2/2009 Yang .......................... 361/91.1

* cited by examiner

*Primary Examiner*—Stephen W Jackson
(74) *Attorney, Agent, or Firm*—Banger Shia

(57) ABSTRACT

A control circuit includes a detection circuit to detect the short-circuited of a current sense terminal of the power converter. It includes a comparator, a verification circuit and a timer circuit. The comparator receives an input signal for generating a sense signal. The input signal represents the switching current of a power switch. The sense signal is enabled when the input signal is lower than a threshold. The verification circuit generates a protection signal in response to the sense signal or/and -a delay signal. The protection signal is generated when the current sense terminal is short-circuited, in which the power switch and the sense signal are enabled after the time delay of the delay signal. The protection signal turns off the power switch for the protection.

5 Claims, 7 Drawing Sheets

CONTROL CIRCUIT WITH SHORT-CIRCUIT PROTECTION FOR CURRENT SENSE TERMINAL OF POWER CONVERTERS

BACKGROUND OF THE INVENTION

1. Field of the Invention

The present invention relates to control circuits and more specifically relates to a control circuit with short circuit protection for current sense terminal of power converter.

2. Description of Related Art

Various power converters have been widely used to provide regulated voltage and current. For the sake of safety, an over-power protection has to provide for protecting both power converter itself and the system. The output power is thus required to be limited for controlling the power converter. Normally, limiting the switching current of the power converter would control the output power. FIG. 1 shows a traditional power converter. The power converter includes a control circuit 10, which coupled to the output voltage $V_O$ of the power converter to generate a switching signal $S_W$ at a switching terminal SW of the control circuit 10 for regulating the output voltage $V_O$. The switching signal $S_W$ is transmitted to a power switch 11 to switch a transformer 12 and control the energy transferred through the transformer 12. As the switching signal $S_W$ becomes enable, a switching current $I_P$ of the power switch 11 is generated accordingly. The switching current $I_P$ is expressed as, $$I_P = \frac{V_{IN}}{L_P} \times T_{ON} \quad (1)$$

where $V_{IN}$ is an input voltage applied to the transformer 10; $L_P$ is the primary inductance of the transformer 12; and $T_{ON}$ is an on-time of the switching signal $S_W$.

The switching current $I_P$ generates an input signal $V_I$ by a resistor 13. The input signal $V_I$ is transmitted to a current sense terminal VI of the control circuit 10. The output voltage $V_O$ is generated from the transformer 12 through a rectifier 14 and a capacitor 15. A reference voltage device 17 and a resistor 16 are connected in serial. The resistor 16 is connected to the output voltage $V_O$. The reference voltage device 17 is connected to an optical isolator 18. The optical isolator 18 generates a feedback signal $V_{FB}$ which is coupled to the control circuit 10.

FIG. 2 shows a conventional control circuit 10 of the power converter. A comparator 101 is coupled to receive the input signal $V_I$ representing the switching current $I_P$ of the power switch 11 (as shown in FIG. 1). Another input terminal of the comparator 101 is coupled to receive the feedback signal $V_{FB}$ to compare with the input signal $V_I$ for the current mode control. A resistor 108 is connected to bias the feedback signal $V_{FB}$. The switching signal $S_W$ is turned off when the level of the input signal $V_I$ is higher than the level of the feedback signal $V_{FB}$. A comparator 102 is coupled to receive the input signal $V_I$ as well and is utilized to limit the maximum current of the power switch 11. The comparator 102 compares the input signal $V_I$ with a current-limit threshold $V_{TH}$. The power switch 11 is turned off cycle-by-cycle in response to the output of the comparator 102 when the current limit set by the current-limit threshold $V_{TH}$ is exceeded. The comparator 102 would limit the maximum value of the output power. The control circuit 10 generates the switching signal $S_W$ to drive power switch 11 in response to the feedback signal $V_{FB}$ for regulating the output voltage $V_O$ of the power converter. An oscillation circuit 103 (OSC) generates a clock signal PLS to the clock-input terminal CK of a flip-flop 104 through an inverter 105. The supply voltage $V_{CC}$ transmits to the D-input terminal D of the flip-flop 104. The reset-input R of the flip-flop 104 is connected to the output terminal of an AND gate 106. The input terminal of the AND gate 106 is connected to the output terminal the comparator 101. Another input terminal of the AND gate 106 is connected to the output terminal of the comparator 102. The output terminal Q of the flip-flop 104 is connected to a AND gate 107. Another input terminal of the AND gate 107 receives the clock signal PLS through the inverter 105. The AND gate 107 generates the switching signal SW from its output terminal. The switching signal $S_W$ is therefore enabled by the clock signal PLS periodically and is controlled by the feedback signal $V_{FB}$. Besides, in order to protect the power switch 11, the switching signal $S_W$ is disabled when the switching current $I_P$ is higher than the current-limit threshold $V_{TH}$.

However, a potential problem exists when the current sense terminal VI of the control circuit 10 is short-circuited as shown in FIG. 3. Both the feedback and the protection functions are disabled under this circumstance, which may cause the permanent damage to the power converter.

SUMMARY OF THE INVENTION

An objective of the invention is to provide a control circuit that turns off the power switch for the protection when short-circuited is occurred.

In accordance with the invention, a control circuit with short-circuit protection is provided. The control circuit includes a detection circuit to detect the short-circuited of a current sense terminal of the power converter. The detection circuit includes a comparator, a verification circuit and a timer circuit. The comparator is coupled to receive an input signal for generating a sense signal. The input signal represents the switching current of a power switch. The sense signal is enabled when the input signal is lower than a threshold. A time delay circuit is utilized to generate a delay signal in response to the enabling of the power switch. Then, the verification circuit generates a protection signal in response to the sense signal and the delay signal. The protection signal is enabled when the power switch or/and the sense signal are enabled after the time delay of the delay signal. Furthermore, the timer circuit is coupled to receive the protection signal for generating a control signal to latch off the power switch. The control signal is generated when the protection signal is existed over a time-out period of the timer circuit. The control signal is coupled to turn off the power switch for the protection.

BRIEF DESCRIPTION OF THE DRAWINGS

The present invention will become more fully understood from the detailed description given hereinbelow illustration only, and thus are not limitative of the present invention, and wherein.

DESCRIPTION OF THE PREFERRED EMBODIMENTS

Figure 1:
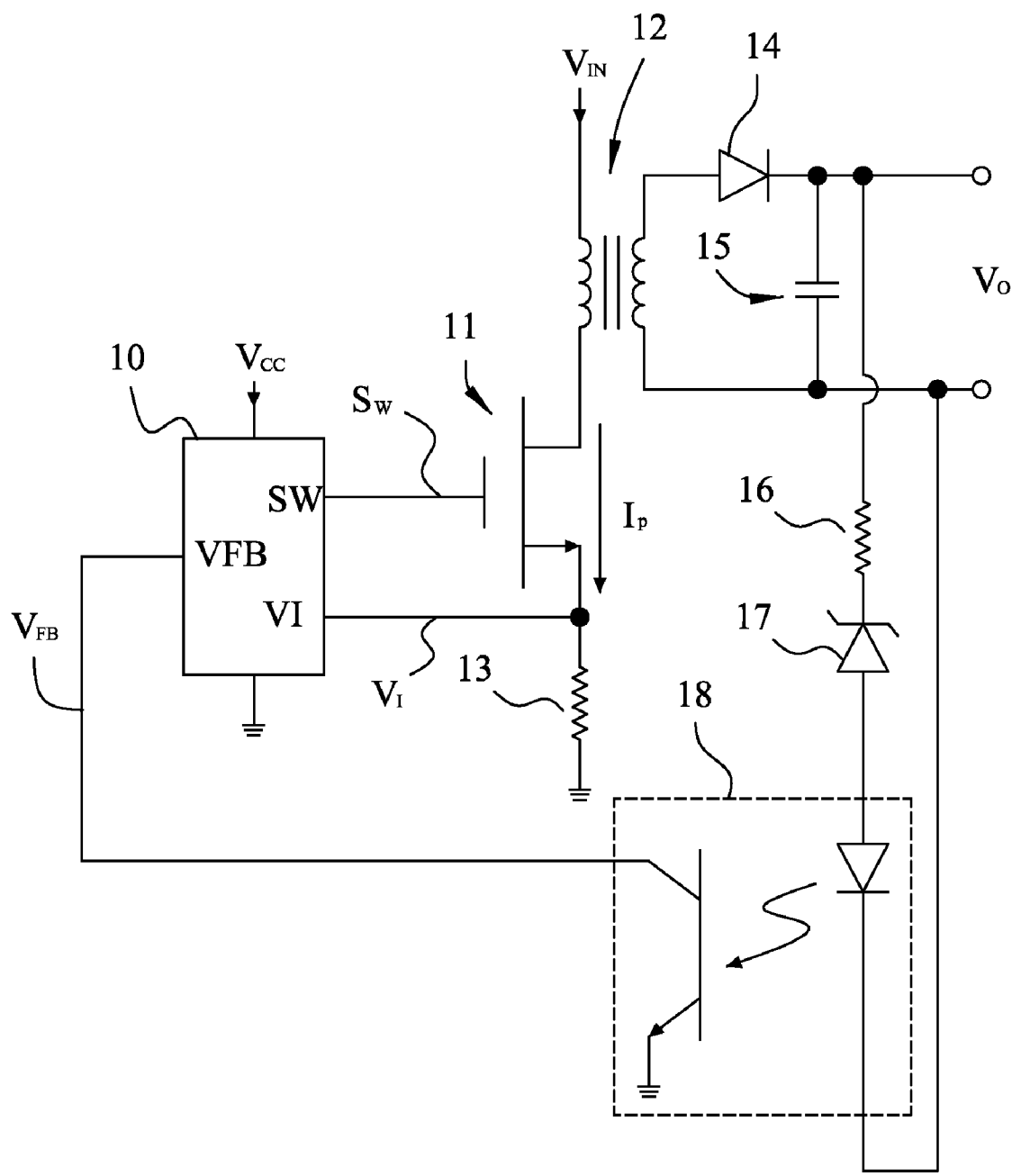
FIG. 1 shows a conventional power converter.
Figure 2:
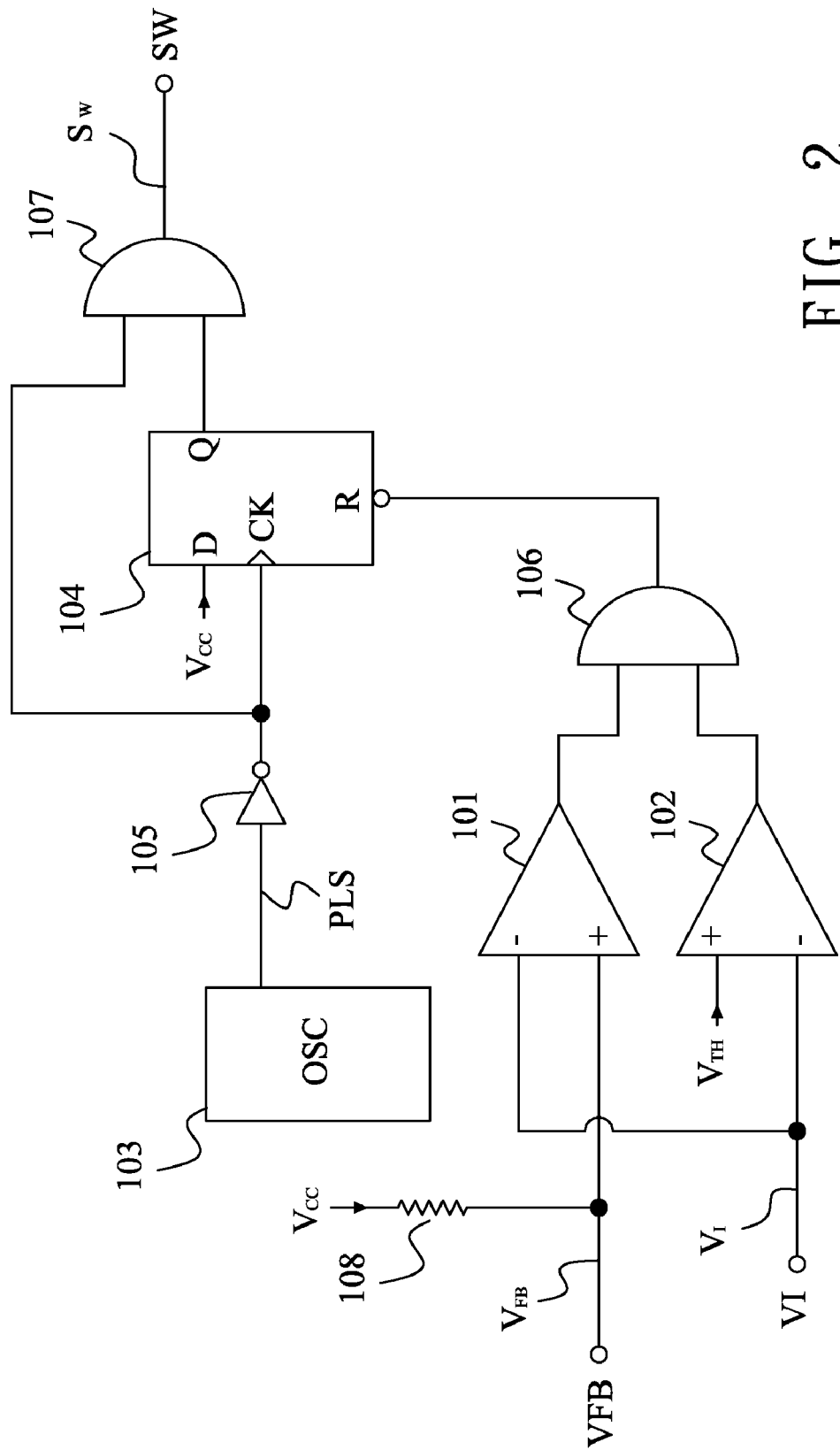
FIG. 2 shows a conventional control circuit of the power converter.
Figure 3:
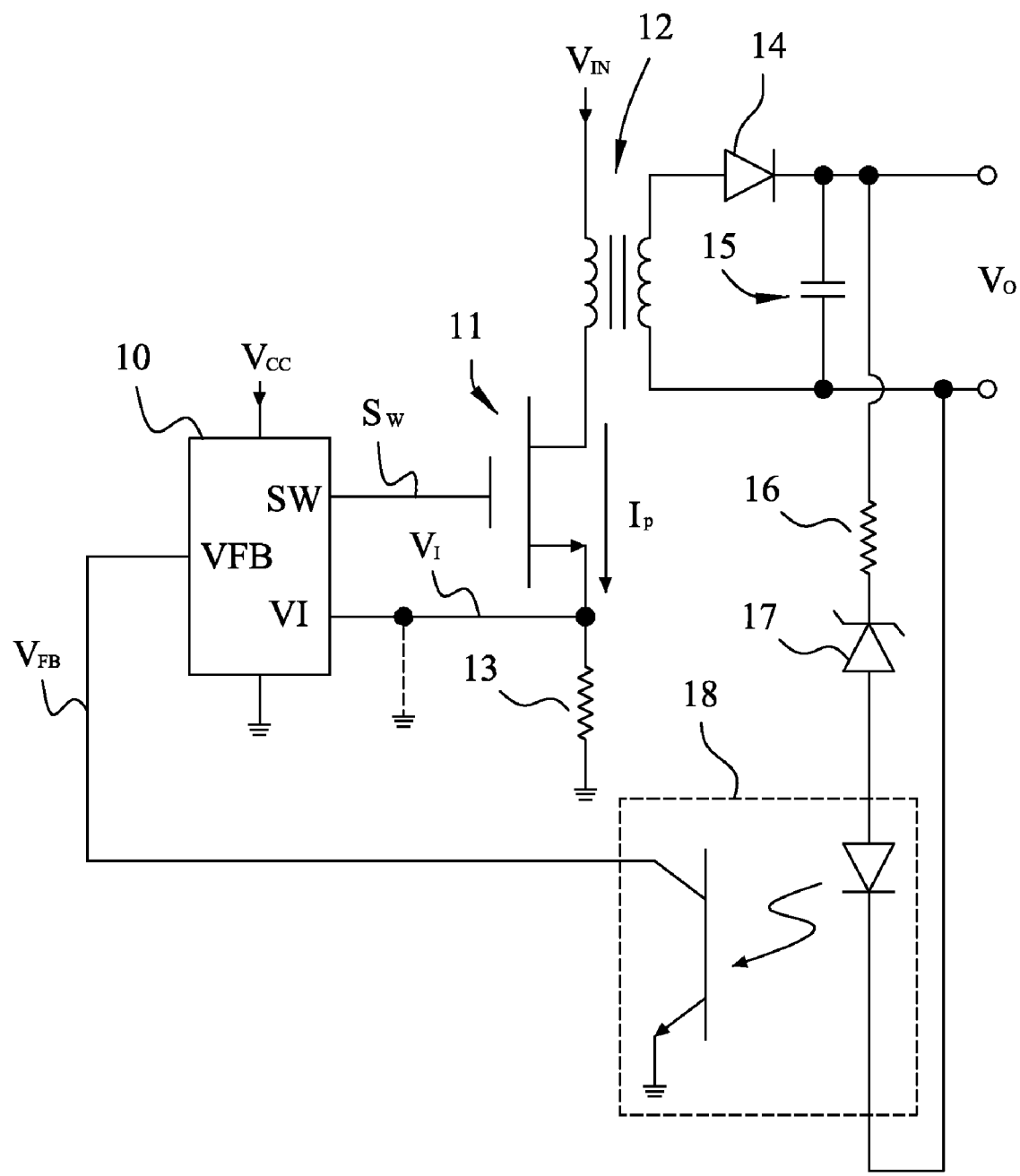
FIG. 3 shows the short-circuited of a current sense terminal of the control circuit.
Figure 4:
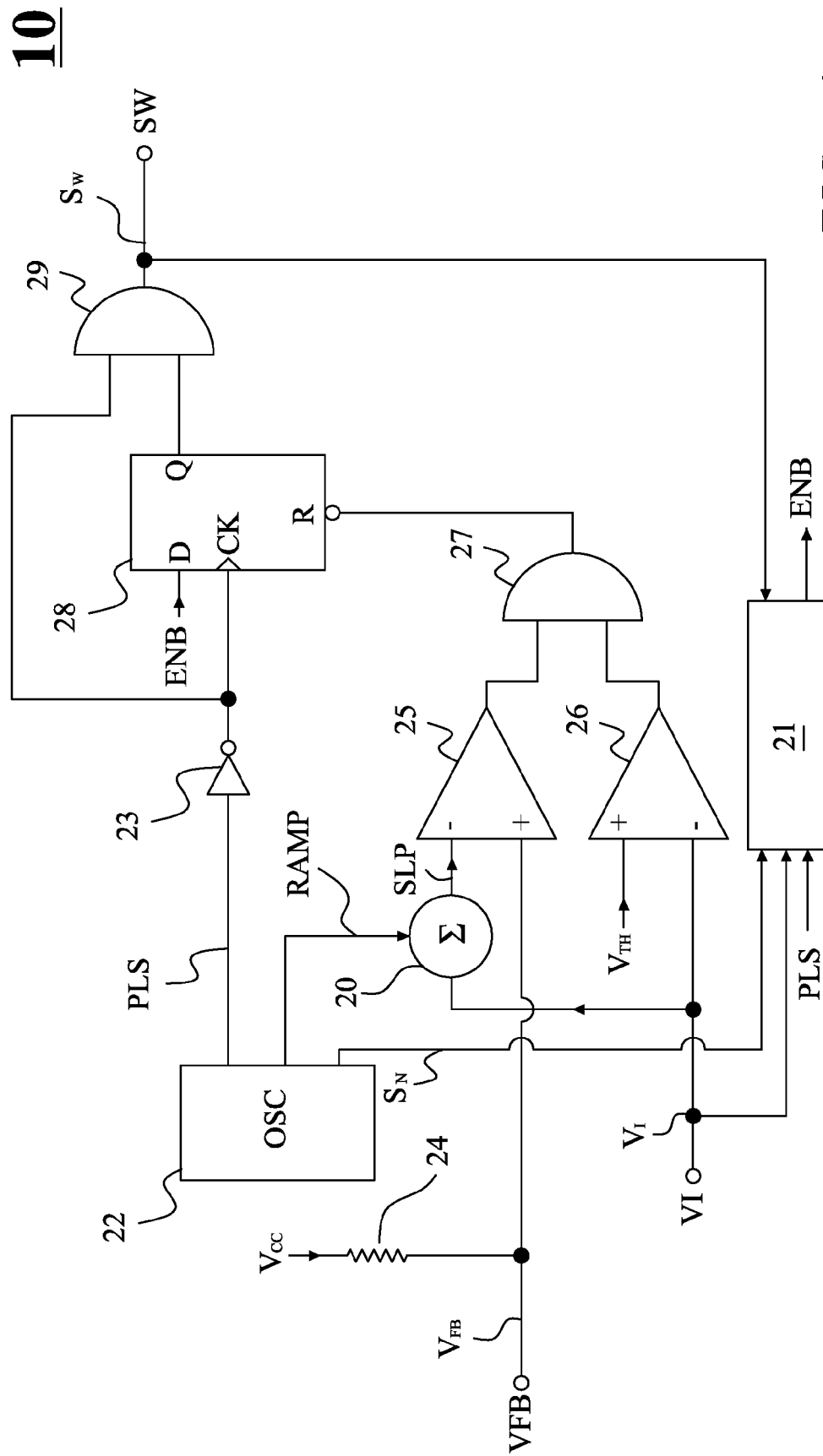
FIG. 4 is a control circuit of the power converter according to present invention.

FIG. 4 shows a preferred embodiment of a control circuit of the power converter according to present invention. The control circuit includes an adder circuit 20, a detection circuit 21, an oscillation circuit 22, two comparators 25, 26, two AND gates 27, 29, an inverter 23 and a flip-flop 28. The adder circuit 20 is coupled to receive a ramp signal RAMP and an input signal $V_I$ for generating a slope signal SLP. The input signal $V_I$ represents the switching current $I_P$ of the power switch 11 (as shown in FIG. 1). The slope signal SLP is correlated to the sum of the ramp signal RAMP and the input signal $V_I$. The oscillation circuit 22 is used to generate the ramp signal RAMP, a time delay signal $S_N$ and the clock signal PLS. The ramp signal RAMP is in phase with the clock signal PLS. The switching signal $S_W$ is enabled when the ramp signal RAMP is enabled. The comparator 25 is coupled to receive the slope signal SLP. Another input terminal of the comparator 25 is coupled to receive the feedback signal $V_{FB}$ to compare with the slope signal SLP for the regulation of the power converter. A resistor 24 is connected to bias the feedback signal $V_{FB}$. The switching signal $S_W$ is turned off once the level of the slope signal SLP is higher than the level of the feedback signal $V_{FB}$. Since the slope signal SLP is composed by the ramp signal RAMP and the input signal $V_I$, the feedback operation of the power converter is maintained despite short-circuited of the current sense terminal VI.

The comparator 26 is coupled to receive the input signal $V_I$ as well. The comparator 26 is utilized to limit the maximum current of the power switch 11. The comparator 26 compares the input signal $V_I$ with a current-limit threshold $V_{TH}$ for limiting the maximum value of the output power. The clock signal PLS is transmitted to the clock-input terminal CK of a flip-flop 28 through the inverter 23. A control signal ENB is transmitted to the D-input terminal D of the flip-flop 28. The reset-input terminal R of the flip-flop 28 is connected to the output terminal of an AND gate 27. The input terminal of the AND gate 27 is connected to the output terminal the comparator 25. Another input terminal of the AND gate 27 is connected to the output terminal of the comparator 26. The output terminal Q of the flip-flop 28 is connected to the AND gate 29 to generate the switching signal SW. Another input terminal of the AND gate 29 receives the clock signal PLS through the inverter 23.

The switching signal $S_W$ is thus enabled by the clock signal PLS if the control signal ENB is enabled. The switching signal $S_W$ controls the power switch 11. The power switch 11 is turned on in response to the falling edge of the pulse signal PLS. The switching signal $S_W$ is further controlled by the feedback signal $V_{FB}$ and the slope signal SLP. The switching signal $S_W$ is disabled to protect the power switch 11, if the switching current $I_P$ (the input signal $V_I$) is higher than the current-limit threshold $V_{TH}$. Furthermore, the detection circuit 21 is coupled to receive the input signal $V_I$, the time delay signal $S_N$, the clock signal PLS and the switching signal $S_W$ for generating the control signal ENB.

Figure 5:
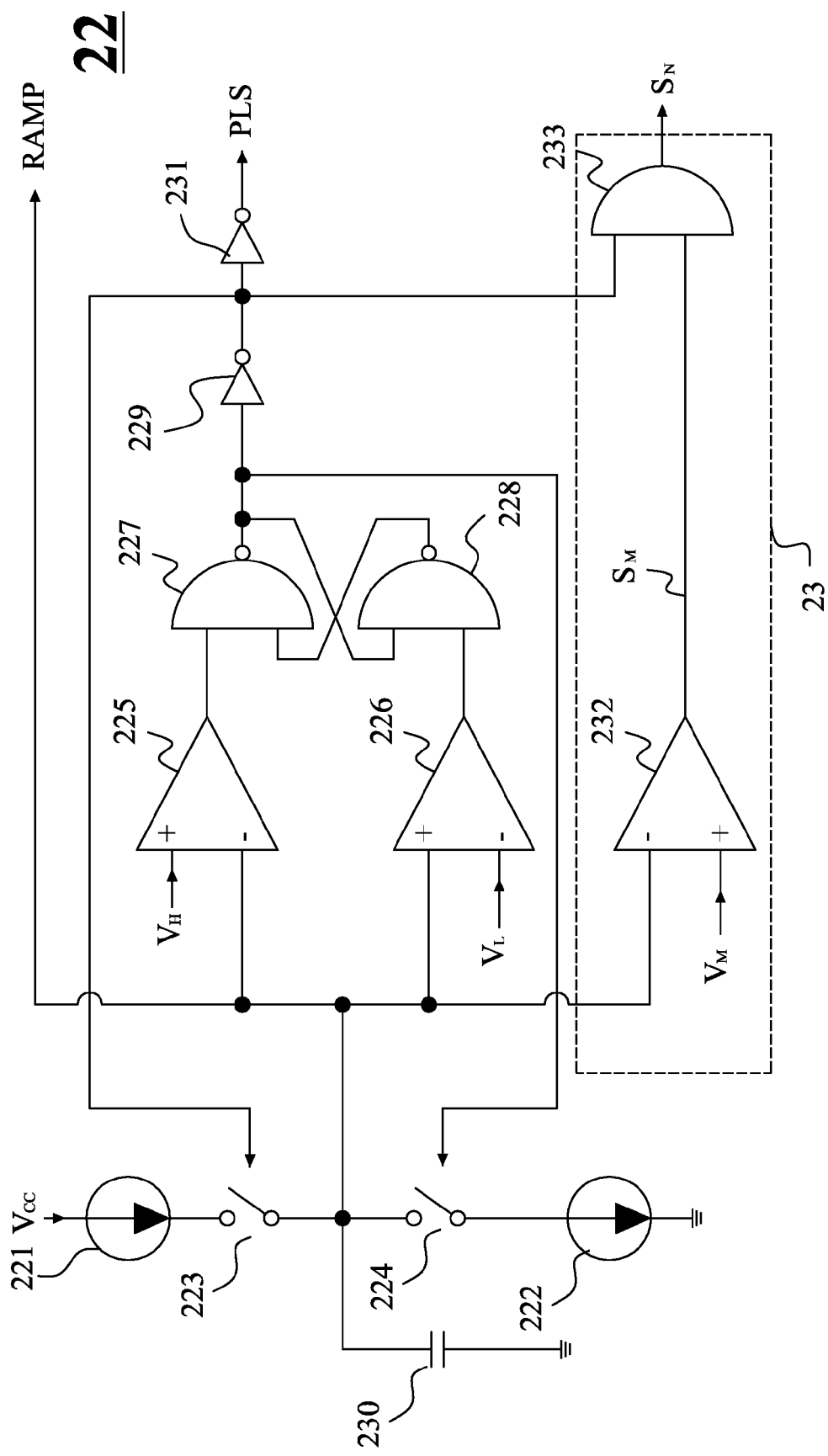
FIG. 5 shows an oscillation circuit according to present invention.

FIG. 5 shows the oscillation circuit 250 in the FIG. 4. A current source 221 is coupled to a capacitor 230 through a switch 223. Another current source 222 is coupled to the capacitor 230 through a switch 224. Two comparators 225 and 226 receive trip-point voltages $V_H$ and $V_L$ respectively. The comparator 225 is coupled to the capacitor 230 to generate a first output to the input terminal of an NAND gate 227. The comparator 226 is coupled to the capacitor 230 as well to generate a second output to the input terminal of an NAND gate 228. The NAND gates 227, 228 connect together to form a RS latch circuit to generate a discharge signal to control the switch 224. The discharge signal also transmits to an inverter 229 and generates a charge signal. The charge signal controls the switch 223, and generates the clock signal PLS through an inverter 231. The ramp signal RAMP is generated at the capacitor 230.

A time delay circuit 23 is used to generate the delay signal $S_N$. The time delay circuit 23 receives a reference signal $V_M$ and includes a second comparator 232 and an AND gate 233. The trip-point voltage $V_H$ is higher than the reference signal $V_M$. The reference signal $V_M$ is higher than the trip-point voltage $V_L$. The second comparator 232 is coupled to receive the ramp signal RAMP for generating a signal $S_M$ at the output terminal of the second comparator 232 in response to the ramp signal RAMP and the reference signal $V_M$. An Input terminal of an AND gate 233 receives the clock signal PLS through the inverter 231. Another input terminal of the AND gate 233 receives the signal $S_M$ for generating the delay signal $S_N$.

Figure 6:
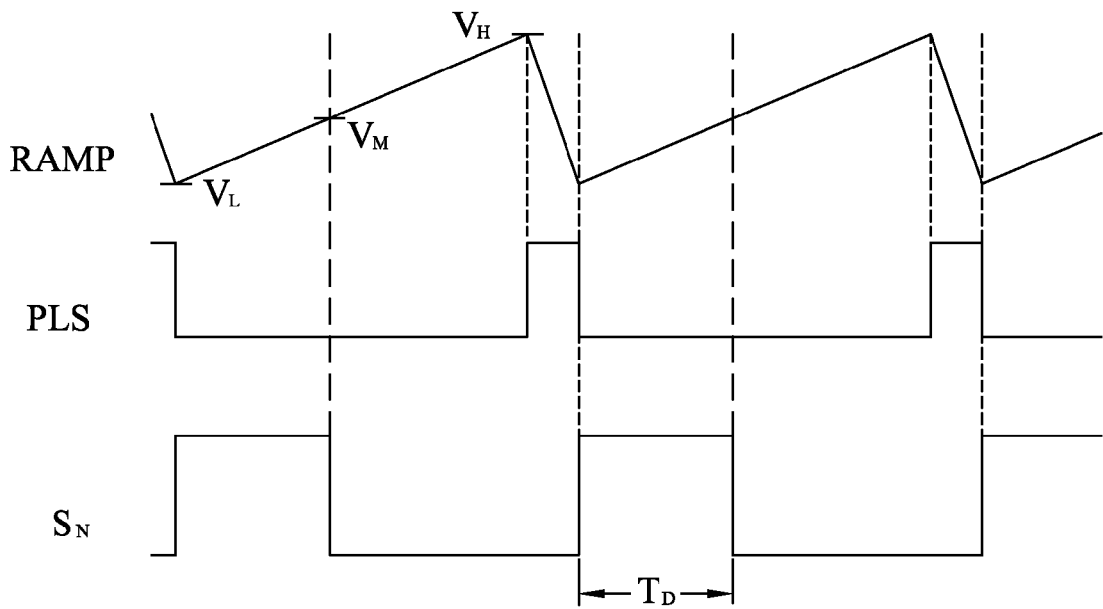
FIG. 6 shows waveforms of the control circuit.

The falling edge of the pulse signal PLS initials the switching signal SW and the delay signal $S_N$. The falling edge of the delay signal $S_N$ is produced after the time delay TD. The pulse width of the delay signal $S_N$ represents the time delay TD of the time delay circuit 23. Waveforms are shown in FIG. 6.

Figure 7:
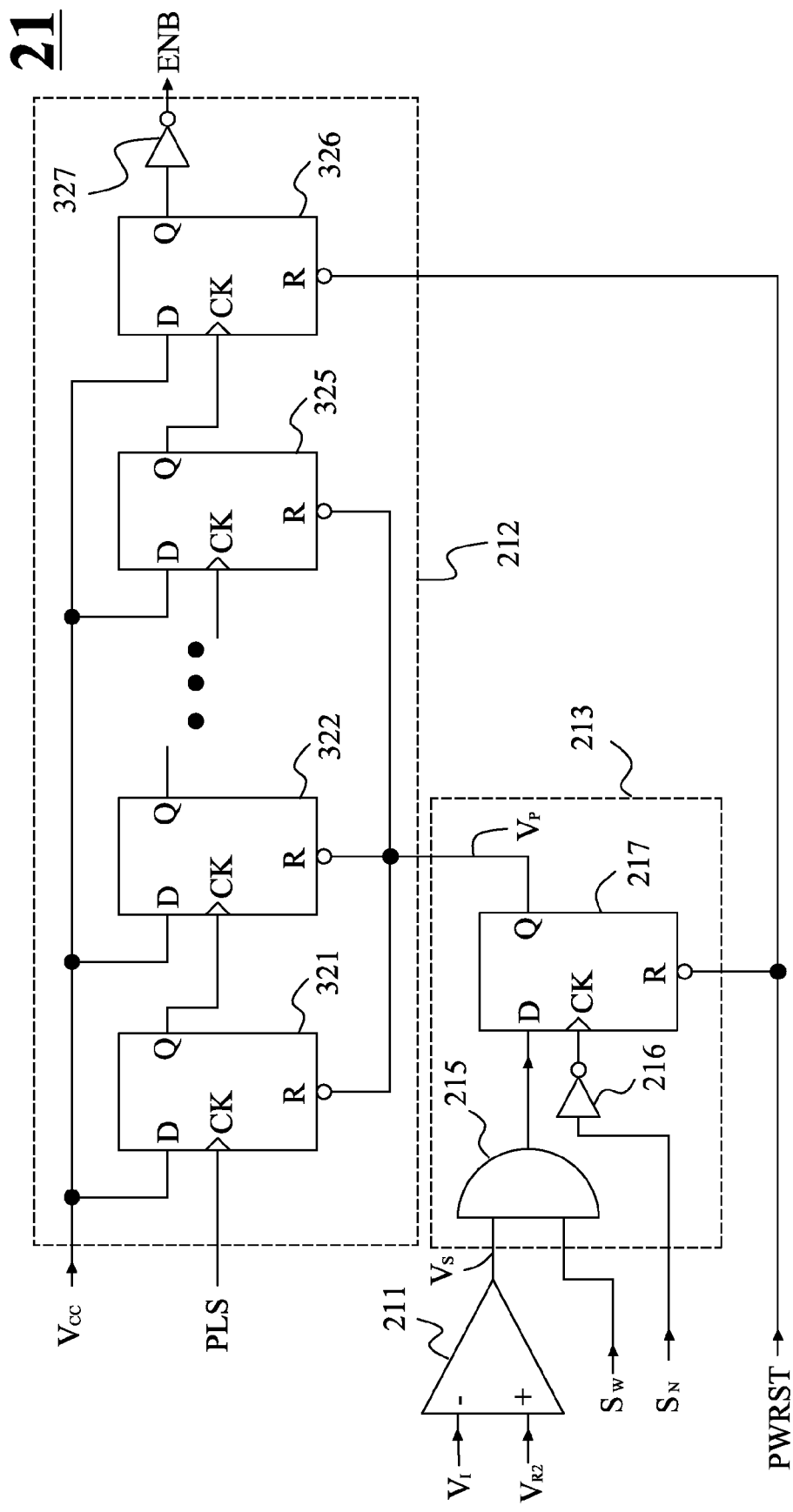
FIG. 7 is the circuit schematic of the detection circuit according to present invention.

FIG. 7 is a preferred circuit schematic of the detection circuit 21 in the FIG. 4. The detection circuit 21 includes a comparator 211, a verification circuit 213 and a timer circuit 212. The comparator 211 is coupled to receive the input signal $V_I$ for generating a sense signal $V_S$. The sense signal $V_S$ is enabled when the input signal $V_I$ is lower than a threshold $V_{R2}$. The verification circuit 213 includes an AND gate 215, an inverter 216 and a flip-flip 217. The AND gate 215 is coupled to receive the sense signal $V_S$ and the switching signal SW. The output terminal of the AND gate 215 is connected to the D-input terminal D of the flip-flop 217. The clock-input terminal CK of the flip-flop 217 receives the delay signal $S_N$ through the inverter 216.

The verification circuit 213 generates a protection signal $V_P$ at the output terminal Q of the flip-flop 217 in response to the sense signal $V_S$ and the delay signal $S_N$. The protection signal $V_P$ is enabled when the power switch 11 or/and the sense signal $V_S$ are enabled after the time delay $T_D$ of the delay signal $S_N$. Furthermore, the timer circuit 212 is coupled to receive the protection signal $V_P$ for generating the control signal ENB to latch off the switching signal SW and the power switch 11. The timer circuit 212 includes flip-flips 321, 322, . . . , 325, 326 and an inverter 327. The flip-flops 321, 322, . . . , 325 is operated as a counter, which is triggered by the clock signal PLS. The reset-input-terminals R of the flip-flops 321, 322, . . . , 325 are connected and receive the protection signal $V_P$. The output of the counter is used to trigger the flip-flop 326 when the counter is over-flow. The flip-flop 326 is operated as a latch to generate the control signal ENB through the inverter 327. The reset-input terminals R of the flip-flop 217 and 326 are connected to a power-on reset signal PWRST. The control signal ENB is generated when the protection signal $V_P$ is existed over a time-out period of the timer circuit 212. The control signal ENB is used to turn off the power switch 11 for the protection.

As shown in equation (1), when the power switch 11 is turned on, the switching current IP should be higher than a certain value after the time delay TD. Therefore the current sense terminal VI is predicted as short-circuit if the input signal VI is detected lower than the threshold VR2 after the time delay TD. Additionally, the timer circuit 212 is used for the debounce of enabling the protection. However, the time-out period of the timer circuit 212 should be limited to ensure the power switch 11 operated under the safe operation area (SOA) during the abnormal condition, such as the output of the power converter and the current sense terminal are short circuited.

Figure 8:
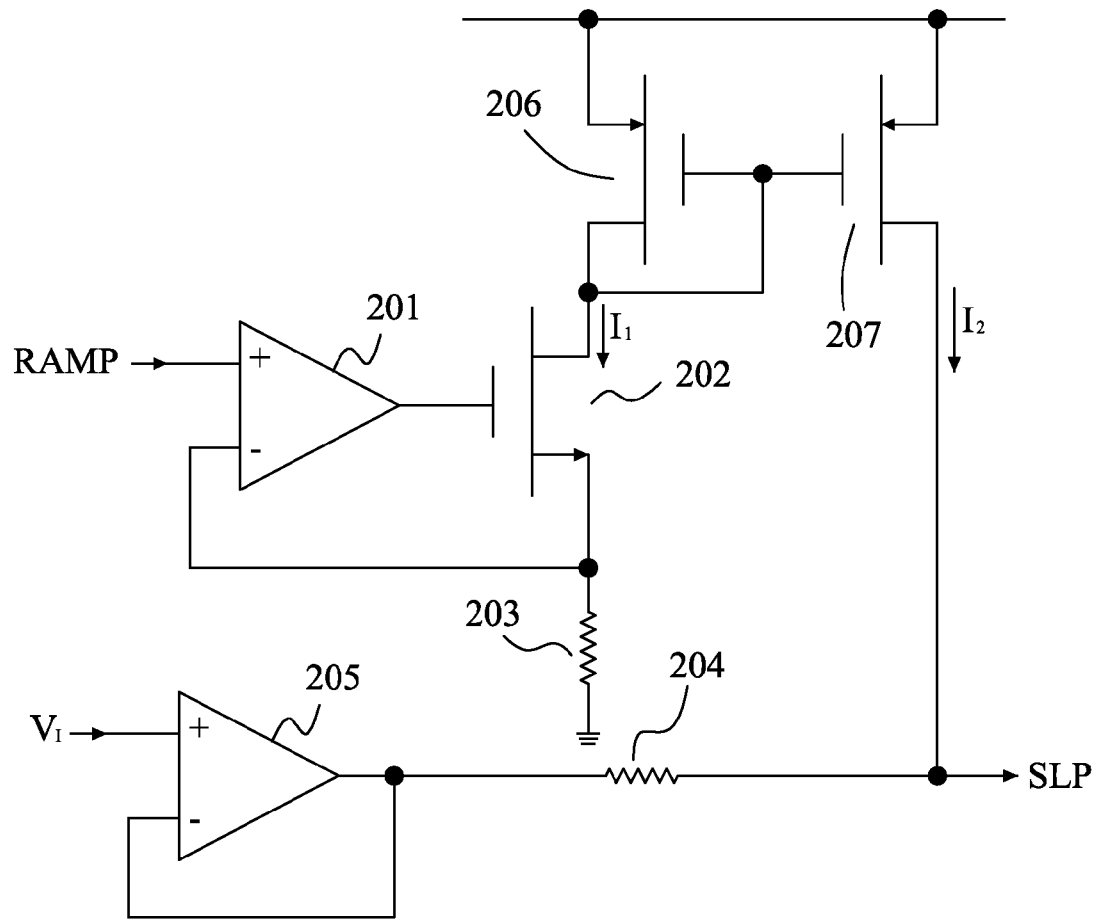
FIG. 8 is an adder circuit according to present invention.

FIG. 8 is a preferred embodiment of the adder circuit 20. The adder circuit 20 is coupled to receive the ramp signal RAMP to generate the slope signal SLP in accordance with the ramp signal RAMP and the input signal $V_f$. An operational amplifier 201, a transistor 202 and a resistor 203 are operated as a voltage-to-current circuit to generate a current $I_1$ in response to the ramp signal RAMP. Transistors 206 and 207 form a current mirror to generate a current $I_2$ in accordance with the current $I_1$. Another operational amplifier 205 is operated as a unit-gain buffer to receive the input signal $V_f$. The output terminal of the unit-gain buffer is connected to a resistor 204. The current $I_2$ is further connected to the resistor 204, which associates with the unit-gain buffer to generate the slope signal SLP. The resistor 204 is correlated with the resistor 203.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control circuit with a detection circuit to detect the short-circuited of a current sense terminal of a power converter, comprising:
    a comparator, coupled to receive an input signal for generating a sense signal, wherein the input signal represents a switching current of a power switch, and the sense signal is enabled when the input signal is lower than a threshold;
    a time delay circuit, generating a delay signal in response to the enabling of a power switch; and
    a verification circuit, receiving the sense signal and a delay signal to generate a protection signal in response to the sense signal and the delay signal;
    wherein the protection signal is enabled when the power switch and the sense signal are enabled after a time delay of the delay signal.

2. The control circuit of claim 1, wherein the protection signal is used to turn off the power switch.

3. The control circuit of claim 1, further comprising a timer circuit coupled to receive the protection signal for generating a control signal to latch off the power switch; wherein the control signal is generated when the protection signal is existed over a time-out period of the timer circuit.

4. The control circuit of claim 1, further comprising an adder circuit coupled to receive a ramp signal to generate a slope signal in accordance with the ramp signal and the input signal; wherein the slope signal associates with a feedback signal to generate a switching signal for switching the power switch; the feedback signal is transmitted to the power converter for regulation, and the ramp signal is generated in response to the enabling of the power switch.

5. The control circuit of claim 1, wherein the time delay circuit comprising:
    a second comparator, coupled to receive a ramp signal, the second comparator to generate a second signal in response to the ramp signal and a reference signal; and
    a logic circuit, coupled to receive a clock signal and generating the delay signal in response to the clock signal and the second signal;
    wherein the clock signal enables the power switch.

* * * * *